United States Patent
Marioni

(10) Patent No.: US 7,719,155 B2
(45) Date of Patent: May 18, 2010

(54) TWO-PHASE SYNCHRONOUS ELECTRIC MOTOR WITH PERMANENT MAGNETS FOR MECHANICAL PRIMING WASHING PUMPS OF DISHWASHERS AND SIMILAR WASHING MACHINES

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 0 days.

(21) Appl. No.: 12/139,697

(22) Filed: Jun. 16, 2008

(65) Prior Publication Data

US 2009/0001824 A1    Jan. 1, 2009

(30) Foreign Application Priority Data

Jun. 18, 2007   (EP)   .................................. 07425381

(51) Int. Cl.
*H02K 1/00* (2006.01)
(52) U.S. Cl. ........................ 310/216.001; 310/216.004; 310/216.008
(58) Field of Classification Search ......... 310/216–218, 310/216.01, 216.004, 216.008, 216.061, 310/216.062
See application file for complete search history.

(56) References Cited

U.S. PATENT DOCUMENTS

| | | | | |
|---|---|---|---|---|
| 2,236,291 | A * | 3/1941 | Kilbourne | 310/218 |
| 3,978,356 | A * | 8/1976 | Spiesberger | 310/156.42 |
| 4,538,086 | A * | 8/1985 | Marsh et al. | 310/258 |
| 5,708,406 | A | 1/1998 | Tsunoda et al. | |
| 6,057,621 | A * | 5/2000 | Suzuki et al. | 310/156.12 |
| 6,384,508 | B1 * | 5/2002 | Marioni | 310/261 |
| 2006/0055275 | A1 * | 3/2006 | Shim et al. | 310/218 |

FOREIGN PATENT DOCUMENTS

| | | | |
|---|---|---|---|
| DE | 875227 | * | 4/1953 |
| DE | 875227 C | | 4/1953 |
| EP | 1760859 A1 | | 3/2007 |
| EP | 1760861 A1 | | 3/2007 |
| JP | 2000-134831 A | | 5/2000 |
| JP | 2003-180044 A | | 6/2003 |
| WO | 99/48189 | | 9/1999 |
| WO | 02/49190 A1 | | 6/2002 |

* cited by examiner

*Primary Examiner*—Quyen Leung
*Assistant Examiner*—Leda Pham
(74) *Attorney, Agent, or Firm*—Akerman Senterfitt

(57) ABSTRACT

A two-phase synchronous electric motor, comprising a permanent-magnet rotor rotating around a rotation axis, and a core lamination pack stator. First and second pairs of pole pieces define: a housing/rotation seat for the rotor. Each pole piece comprises a core, having an end associated to the core lamination pack, a free end portion facing the rotor housing/rotation seat, and a coil. The free end portion of the core of each pole piece comprises a core lamination pack extending in parallel planes to the rotation axis of the rotor. The core laminations have a variable length to form a surface of the free end portion of the core of each pole piece that is concave in the axial direction and partially wraps the rotor. A coupling between the rotor and a load is through a motion transmission joint having driving and driven elements associated in a kinematic series.

8 Claims, 13 Drawing Sheets

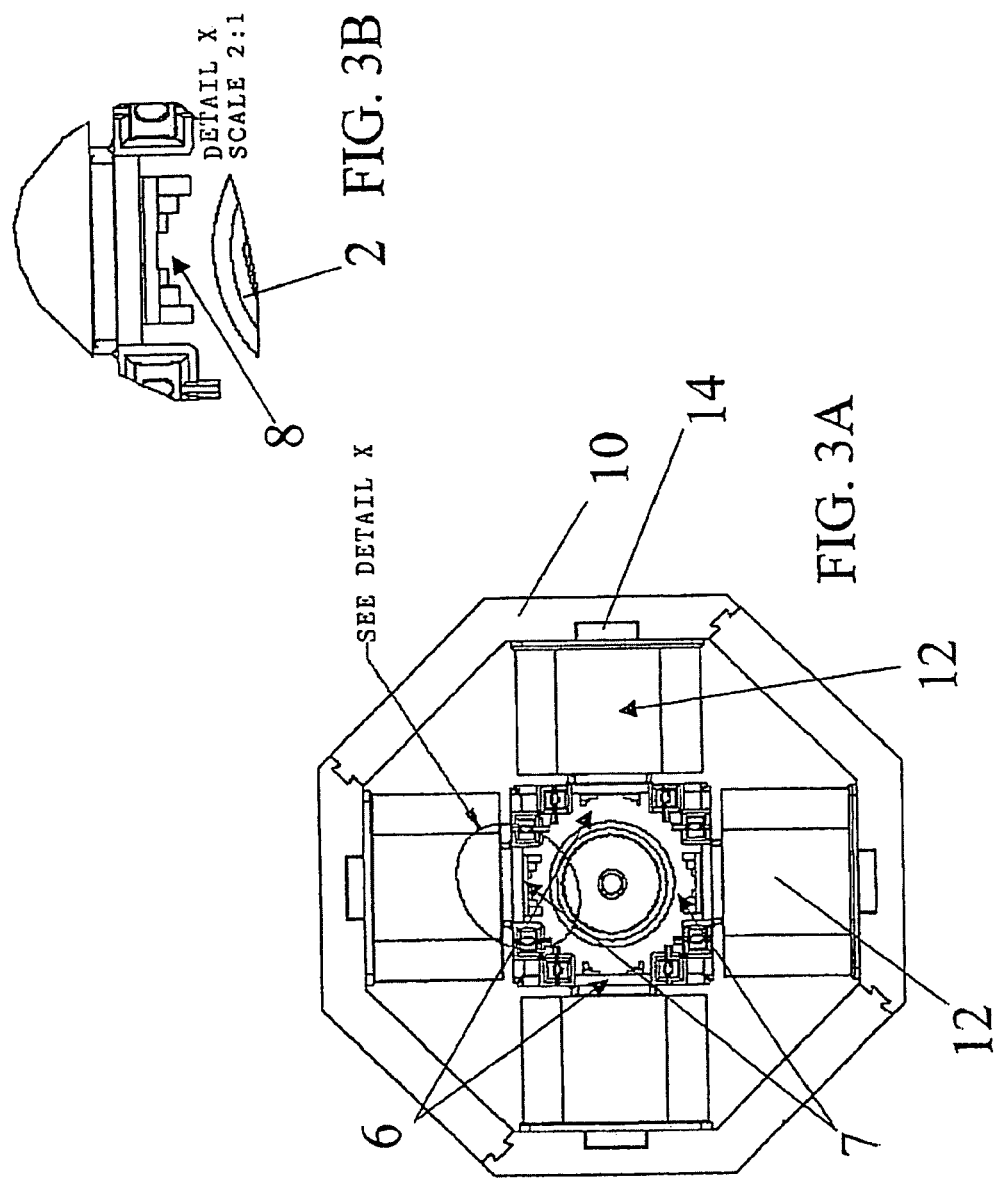

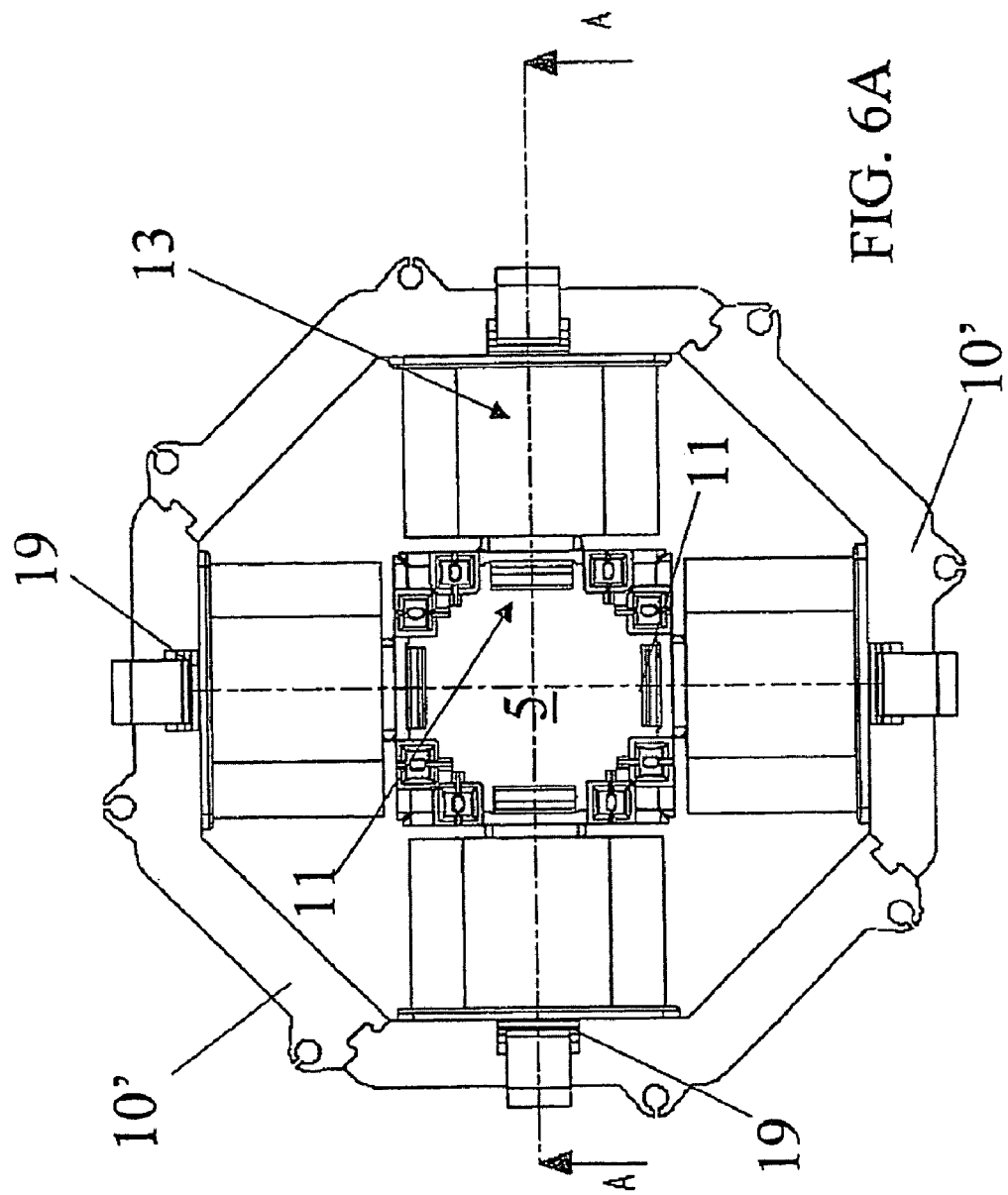

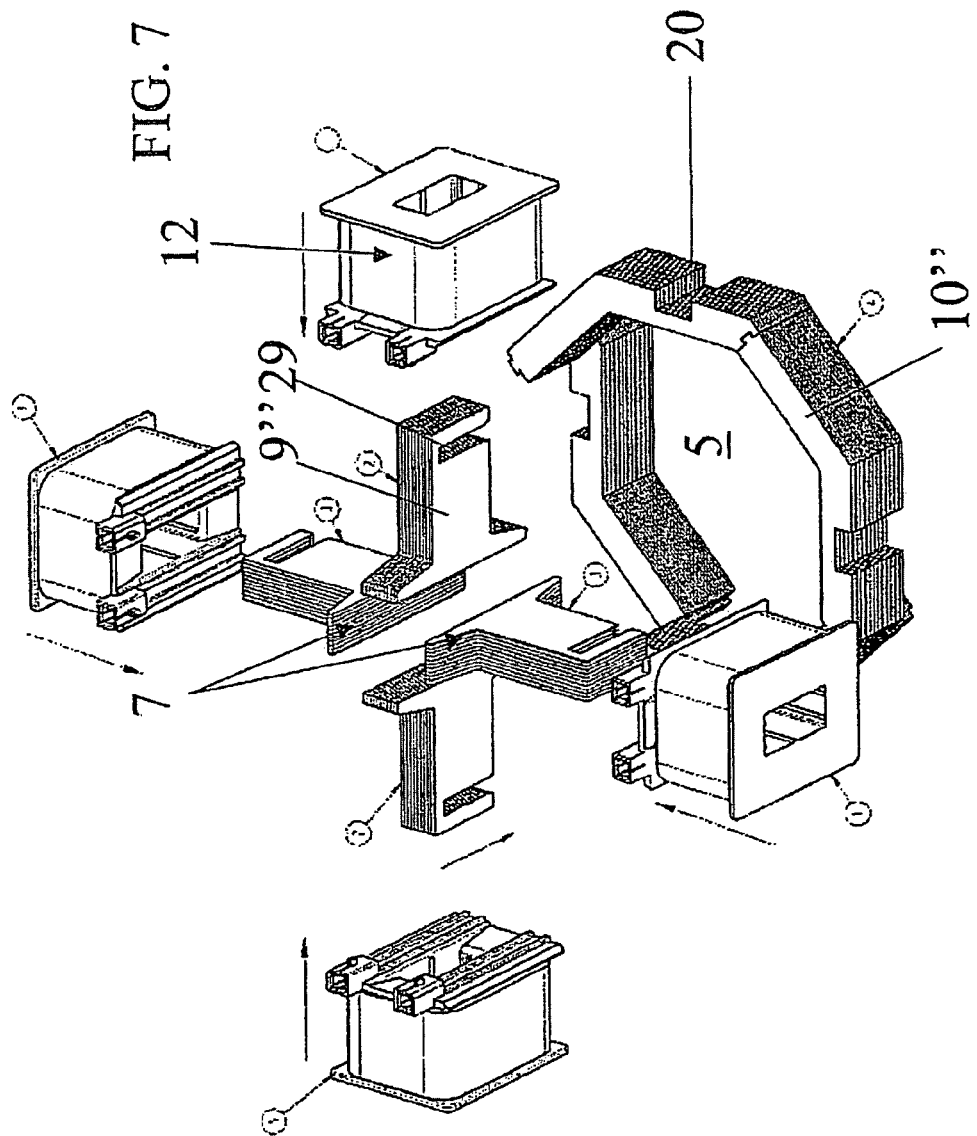

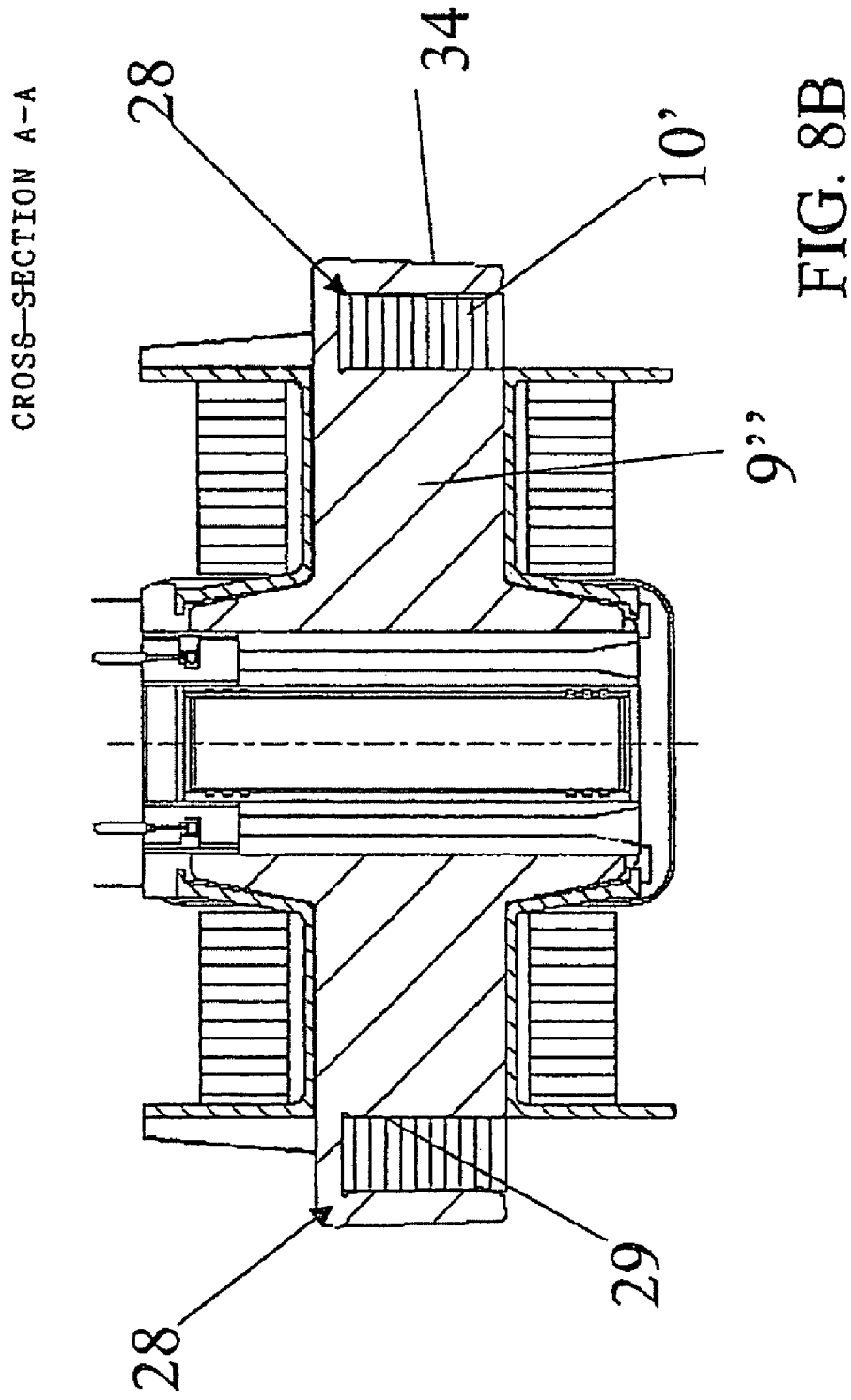

TWO-PHASE SYNCHRONOUS ELECTRIC MOTOR WITH PERMANENT MAGNETS FOR MECHANICAL PRIMING WASHING PUMPS OF DISHWASHERS AND SIMILAR WASHING MACHINES

FIELD OF APPLICATION

The present invention relates to a two-phase synchronous electric motor with permanent magnets for mechanical priming washing pumps of dishwashers and similar washing machines.

More particularly this invention relates to a two-phase electric motor comprising a permanent-magnet rotor and a core lamination-pack stator, wherein a first and second pairs of pole pieces define a housing/rotation seat for said rotor.

Even more particularly, the present invention relates to a core lamination-pack stator, for a two-phase synchronous electric motor of the above type, wherein each pole piece comprises a core, with an end being associated to said core lamination pack and an opposite free end portion facing said rotor housing/rotation seat, and a coil for a stator winding on a corresponding support being wedged on said core.

PRIOR ART

It is well known how, to start centrifugal washing pumps, used in household washing machines (mainly dishwashers and the like), mainly but not only in the average or fairly low range, asynchronous electric motors or purely mechanical priming synchronous motors are used to reduce production costs. These synchronous motors are generally of the two-phase type and equipped with four pole pieces.

It is also known how these synchronous motors are of the type with central permanent-magnet rotor and core lamination-pack stator, with pole pieces being realised according to different configurations, being designed to implement different and incidental functions, both from an electrical and mechanical point of view, always with the best possible performances, reduced size (structural comptactedness), assembly and implementation ease, cheap realization, reliability and durability.

Pole pieces have been thus realised, with core lamination-pack core and free end portion (in this field, the specific name of this end is stator small end) being enbloc in a metallic alloy or a sintered material; others with the core and free end portion being obtained by enbloc moulding of a convenient ferromagnetic material; some others more with cylindrical or oval-section core and free end portion in metallic sintered material.

Although advantageous under many points of view, electric motors of the type being considered suffer from known and not yet overcome technical drawbacks, mainly constituted by an even very high demagnetization effect, accompanied by as high losses due to the Joule effect and high pick-up voltages.

For example, in the European patent application no. 06016772.3 by the same Applicant, a two-phase mechanical synchronous washing pump is described, having a synchronous motor comprising a core-lamination-pack stator and pole pieces being realised with a sintered material. More particularly, the stator portion represented by the core and the pole piece free end is obtained by moulding with Somaloy500. But this solution has demagnetization problems due to a flow concentration in the core central area preventing a flow extension on the whole height of the pole piece end. This is due to physical limitations of the currently available SMC material.

Moreover, by using a SMC core, the surface must be increased by at least 25% in order to be able to operate in the same magnetic conditions because of the different features B-H of the two materials. But in this way the length of the average turn, the coil resistive value increases, and higher losses due to the Joule effect as well as higher costs consequently occur.

Even supposing to use a cylindrical core to decrease the quantity of copper wire used in the stator winding, negative demagnetization effect are experimentally observed, due to the poor electromagnet linkage. More particularly, the problems are due to the fact that the SMC material is anisotropic and the permeability thereof can be different between the centre and the periphery because of the moulding mode through which it is realised.

This last problem is due to the considerable height difference between the core and the pole piece end (about 20 mm vs 50 mm), which does not produce the desired effects with the sintered material.

It must also be said that the pump pick-up voltage also increases when the main and auxiliary cores are closer, with a subsequent increase in the leakage reactance and subsequent pejorative conditions during the initial transient.

Consequently, prior art synchronous and two-phase electric motors have several limitations not allowing the required performances to be obtained in dishwashers of the fairly low range at costs corresponding to the price range for which these machines are tempting on the market.

The technical problem underlying the present invention is to realise en electric motor of the above type, wherein the core lamination-pack stator has structural and functional features suitable to ensure an important and considerable reduction of the demagnetization effect and of the losses due to the Joule effect, presently detectable in similar prior art electric motors.

SUMMARY OF THE INVENTION

This problem is solved, according to the present invention, by a two-phase synchronous electric motor, comprising a permanent-magnet rotor, rotating around a corresponding rotation axis, and a core lamination-pack stator, wherein a first and second pairs of pole pieces define a housing rotation seat for said rotor and wherein each pole piece comprises a core, having an end associated to said core lamination pack and a free end portion, facing, said rotor housing/rotation seat, a coil wound on a respective support wedged on said core, characterised in that at least said free end portion of the core of each pole piece is composed of a core lamination pack extending in respective parallel planes to said rotation axis of the permanent-magnet rotor. According to a first embodiment of the present invention, said core and corresponding free end portion are realised enbloc and they are composed by a single core lamination pack extending in respective planes parallel to said rotation axis.

But an alternative embodiment is also provided, wherein the end portion of each pole piece is structurally independent from the respective core, whereto it can be connected for example by mortising. In this case the core has a core lamination pack extending in respective planes which are transverse to the rotation axis.

Further features and advantages of the motor according to the present invention will be apparent from the following description of a detailed embodiment which is indicative and not limiting example with reference to the attached drawings.

BRIEF DESCRIPTION OF THE DRAWINGS

In the drawings:

FIG. 3A is a view from above of the detail of FIG. 2 in the assembled condition;

FIG. 3B is an enlarged-scale and more detailed view of FIG. 3A;

FIG. 6A is a view from above of the detail of FIG. 6 in the assembled condition;

FIG. 7 is a perspective and schematic exploded view of a detail showing a third embodiment of the electric motor realised according to the present invention;

FIG. 8B is a schematic and sectional view of the detail of FIG. 8A taken according to the section line A-A;

DETAILED DESCRIPTION

Figure 1:
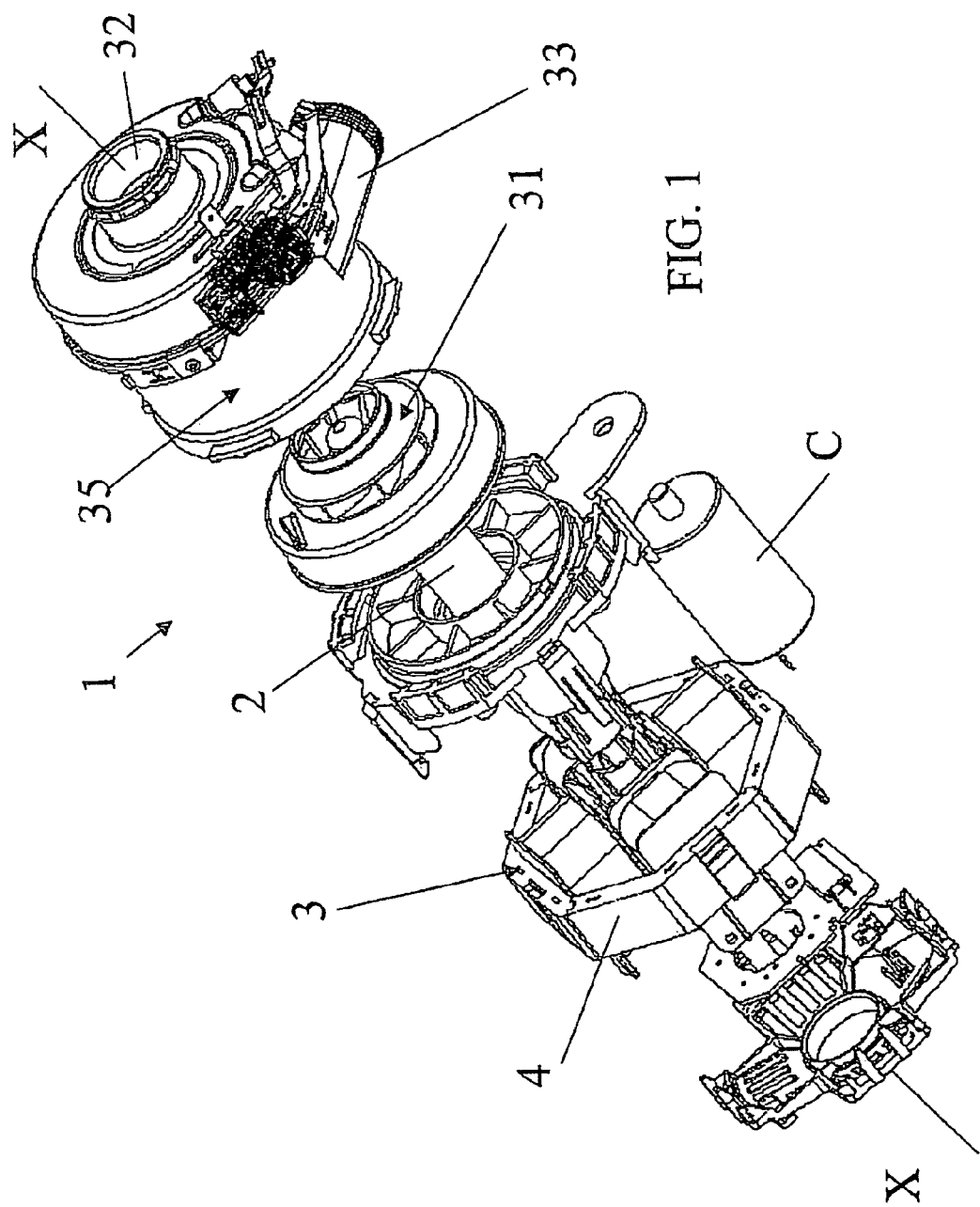
FIG. 1 is a perspective and schematic exploded view of an electric motor realised according to the present invention.

With reference to the drawings, a synchronous electric motor realised according to the present invention is globally and schematically indicated with 1.

The motor 1 is of the type with central rotor 2 and peripheral stator 3, the permanent-magnet rotor 2 being essentially cylindrically-shaped. This motor 1 is particularly suitable for mechanical priming washing pumps to be incorporated in dishwashers and similar washing machines. The rotor 2 is rotating around a respective rotation axis which is indicated in the drawings with X.

As it is well known to the skilled in the art, the motor 1 is intended to drive the operating organ, i.e. an impeller 31, of the pump 35.

The pump 35 comprises a protection case being formed by a cup-like body with a hole defining an opening for a suction duct 32. A radially-extending delivery duct 33 is connected enbloc into the cup-like case.

A chamber for the impeller 31 is defined in the pump case; this chamber is tightly closed at the bottom by a lid being wedged on the cup-like body opening.

The lid centrally provides a hole to let the end of the driving shaft pass, which is kinematically coupled to the impeller 31 by means of a double-joint coupling described for example in the European patent no. 0 983 630 of the same Applicant.

More particularly, the coupling between the driving shaft and the impeller is obtained by interposing two motion transmission joints being associated in a kinematic series.

A first joint comprises a driving tooth being integral with the shaft end turned towards the impeller and a second driven tooth, being eccentric in turn with respect to the axis X-X, which is rotating with respect to the rotor within a chamber cut below the impeller.

This second driven element of the first motion transmission joint is the first driving element of the second motion transmission joint also comprising a second driven element being integral with the impeller.

The angle covered by each motion transmission joint is less than a 360° round angle, but globally the angle covered by the pair of motion transmission joints being associated in a kinematic series exceed 360°.

In this way the rotor rotation freedom is considerably increased during the motor starting, before that the real dragging of the load occurs, the real dragging being represented in this case by the impeller 31 of the pump 35.

This feature allows the two-phase motor of the present invention to be started gradually enough to allow him to reach the synchronous condition in an optimum way.

Figure 9:
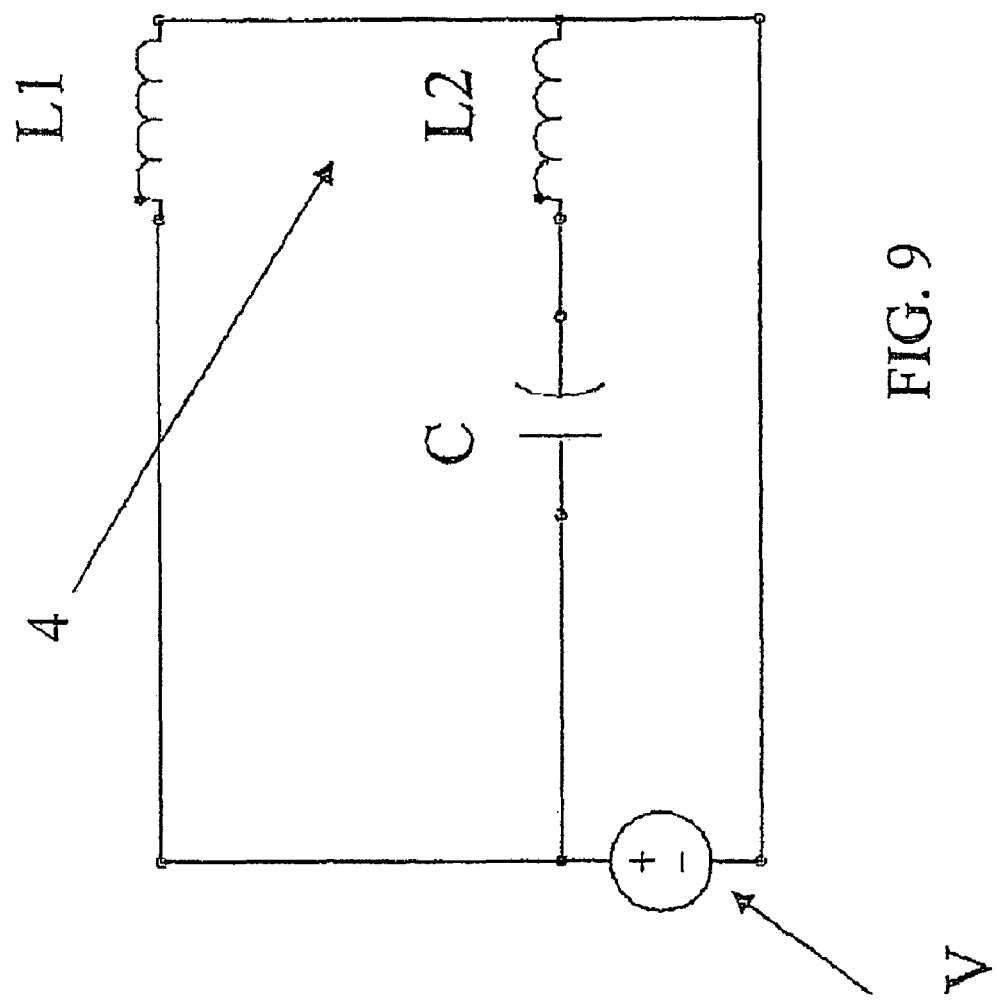
FIG. 9 is a schematic view of the power supply modes of the stator windings of the electric motor according to the invention.

According to the present invention, the above-mentioned rotor-load coupling device cooperates with the motor power supply modes which, as well shown in FIG. 9, allow a phase displacement to be obtained in the power supply of the windings L1, L2 of the stator 4 by using a simple capacitor C.

The initials L1 and L2 mean the two-phase motor windings arranged in quadrature comprising each two coils being opposed and series-connected to each other and they are thus considered as a single inductive element called L1 or L2.

Then, while one of the windings, the one indicated with L1, is directly powered by the network power supply voltage V, the other winding L2 is connected to the same power supply source by interposing the capacitor C.

In this way a phase displacement of the voltage (or current) vector is obtained, allowing the motor 1 to be started by generating a rotating magnetic field in the stator magnetic circuit.

It is well-known that two windings in quadrature, powered by simple harmonic currents being mutually out of phase by a time corresponding to 90 degrees, generate each a fixed magnetic field whose sum forms a rotating magnetic field. The more the fixed magnetic field shape of each winding comes close to a sinusoid in space, the more the field resulting from the sum thereof only comprise the sinusoidal component in space and rotating at the synchronous speed. This means that an observer being integral with the rotor arranged at the synchronous speed is able to measure a magnetic field value being constant in time. By a winding with a high number of coils per phase, being mutually out of phase in space and/or with a different pitch, it is possible to bring the fixed magnetic field shape near to a sinusoid in space and thus to realise what has been just above described. The so-constructed motors are called distributed-winding motors and they can theoretically express a torque being constant in time.

Instead the motor according to the invention is of the concentrated-winding type, since each phase is composed of two opposed identical coils and thus it does not generate a magnetic field having a sinusoidal shape in space, but a magnetic field having an approximately trapezoidal shape. The magnetic field resulting from the sum of the two phase windings comprises, besides the sinusoidal component in space and rotating at the synchronous speed, the so-called harmonic fields with a lower wave length and a lower rotation speed. The latter are responsible for torque oscillations which, in the motor according to the invention, are advantageously exploited in order to favour the starting according to the mechanical resonance principle similarly to the single-phase motor. Unlike the latter, being characterised by an harmonic field counter-rotating at the network frequency with an amplitude corresponding to the synchronous field, in the motor according to the invention, the harmonic fields are instead considerably lower than the synchronous one and torque oscillations do not compromise the silentness thereof.

Now, in order to further optimise the motor structure according to the invention meanwhile reducing production and assembly costs, the stator 4 structure is described in detail. This structure can be advantageously linked to the double-joint kinematic coupling between the motor and the load and to the phase displacement capacitor C expedient.

Figure 2:
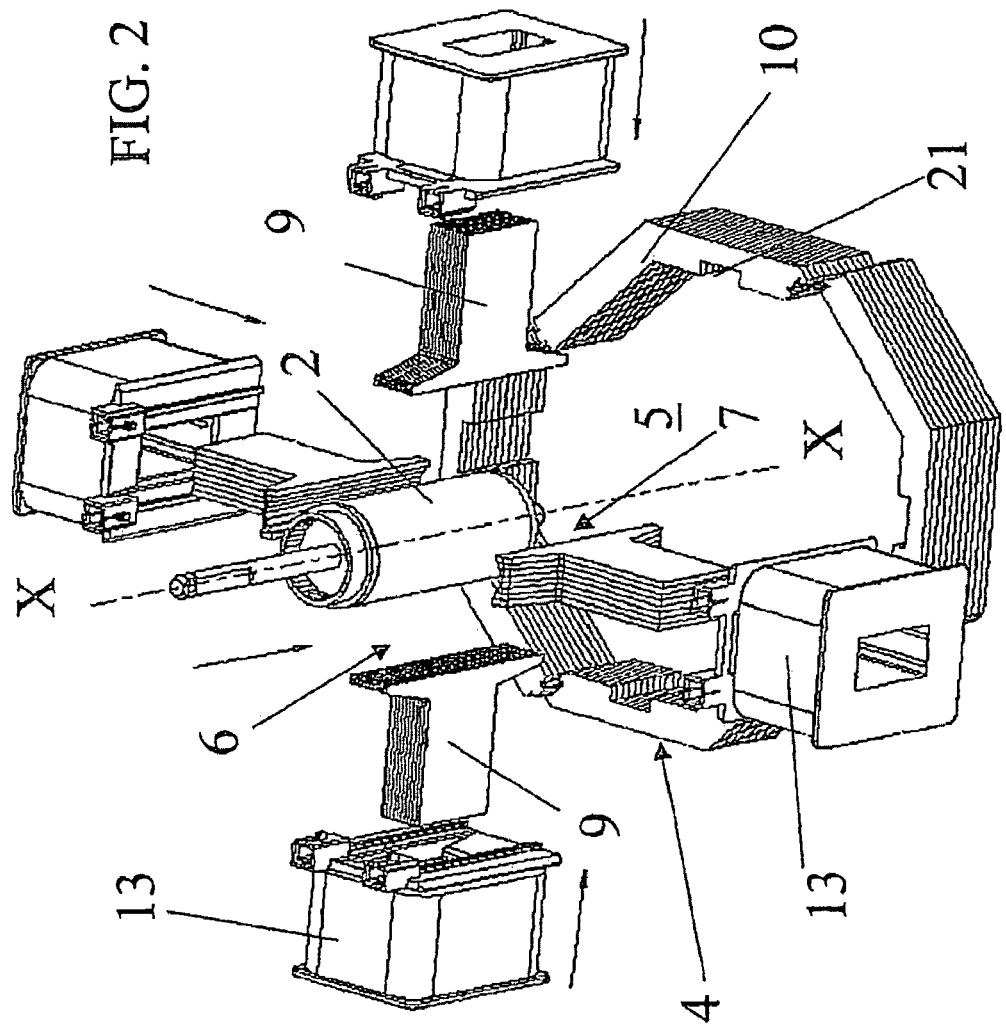
FIG. 2 is a perspective enlarged-scale view of a detail of the motor of FIG. 1.

More in detail, the synchronous electric motor 1 of the present invention is a two-phase motor wherein the peripheral stator 4 has a core lamination pack 10 and it comprises a first 6 and second 7 pairs of pole pieces 8 (well visible in FIG. 2) defining a housing-rotation seat 5 for said rotor 2. The stator is octagon-shaped with sections which can be associated by fitting. In a preferred embodiment the pack 10 height is about 20 mm.

Each pole piece 8 comprises a core 9, having an end 14 associated to said core lamination pack and a free end portion 11, facing said housing-rotation seat 5 of the rotor 2. The end portion axial extension can vary up to 95% of the rotor 2 axial extension, and it can be chosen for example of 50 mm.

A coil 12 is wound on a respective support 13 being wedged on said core 9.

Advantageously according to the present invention at least the free end portion 11 of the core 9 of each pole piece 8 is formed by a core lamination pack 15 extending in respective planes being parallel to said rotation axis X of the permanent-magnet rotor 2.

This free end portion 11 is also enbloc with the respective core 9 and they are both formed in a single core lamination pack.

The end 14 of the core 9 associated to the stator 4 core lamination pack 10 is inserted, simply by fitting, in an indent 21 cut in a section of the pack 10 turned towards the rotor.

Figure 3:
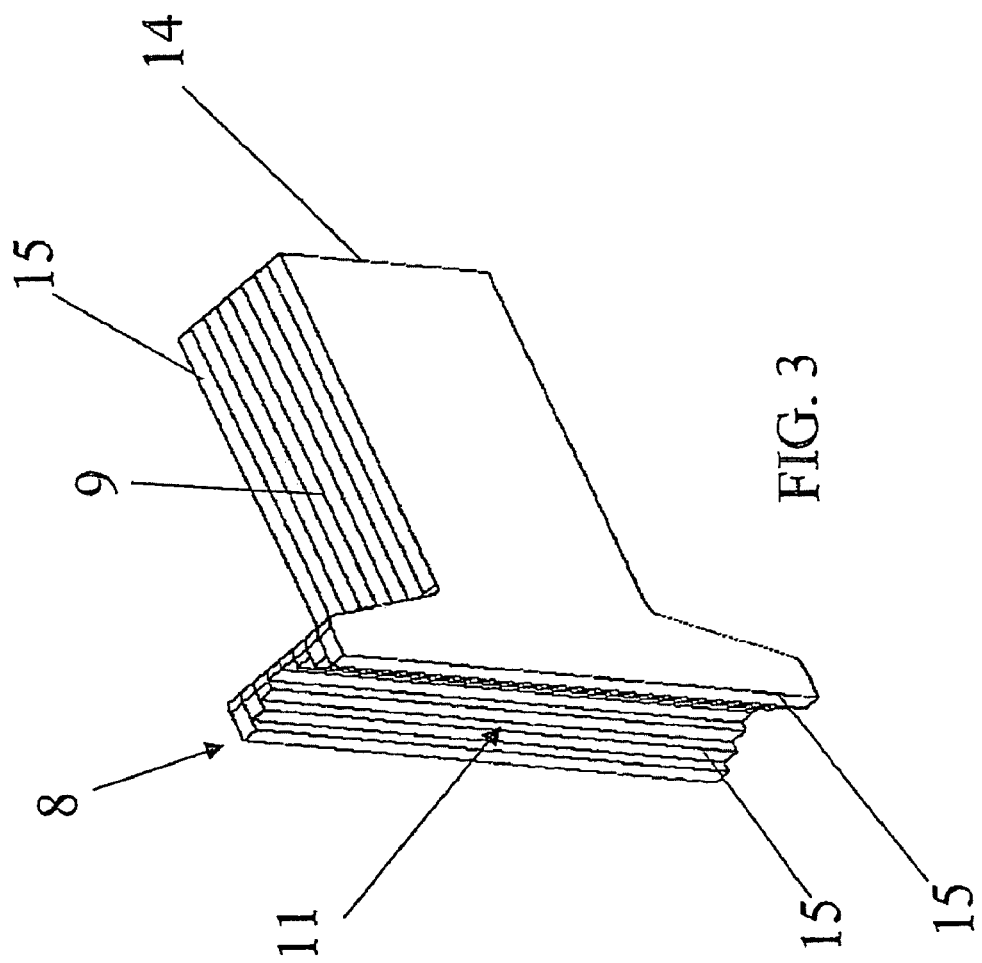
FIG. 3 is a perspective and schematic view of a stator element being incorporated in, the detail of FIG. 1.

As it can be appreciated from FIG. 3, core laminations 15 composing the free end portion 11 have been chosen with a variable length so as to make the surface configuration of this pole piece end portion 11 slightly wrapping in the axial direction the rotor 2 permanent magnet. In other words, the surface of the end portion 11 turned towards the rotor 2 is slightly concave in the axial direction due to the overlap of core laminations with different length. In this way the flux due to the rotor permanent magnet being connected to the stator is increased.

However this feature must not be considered as limiting of the Applicant rights since the end portion 11 configuration wrapping the rotor is not strictly necessary for the scope of the invention.

Figure 6:
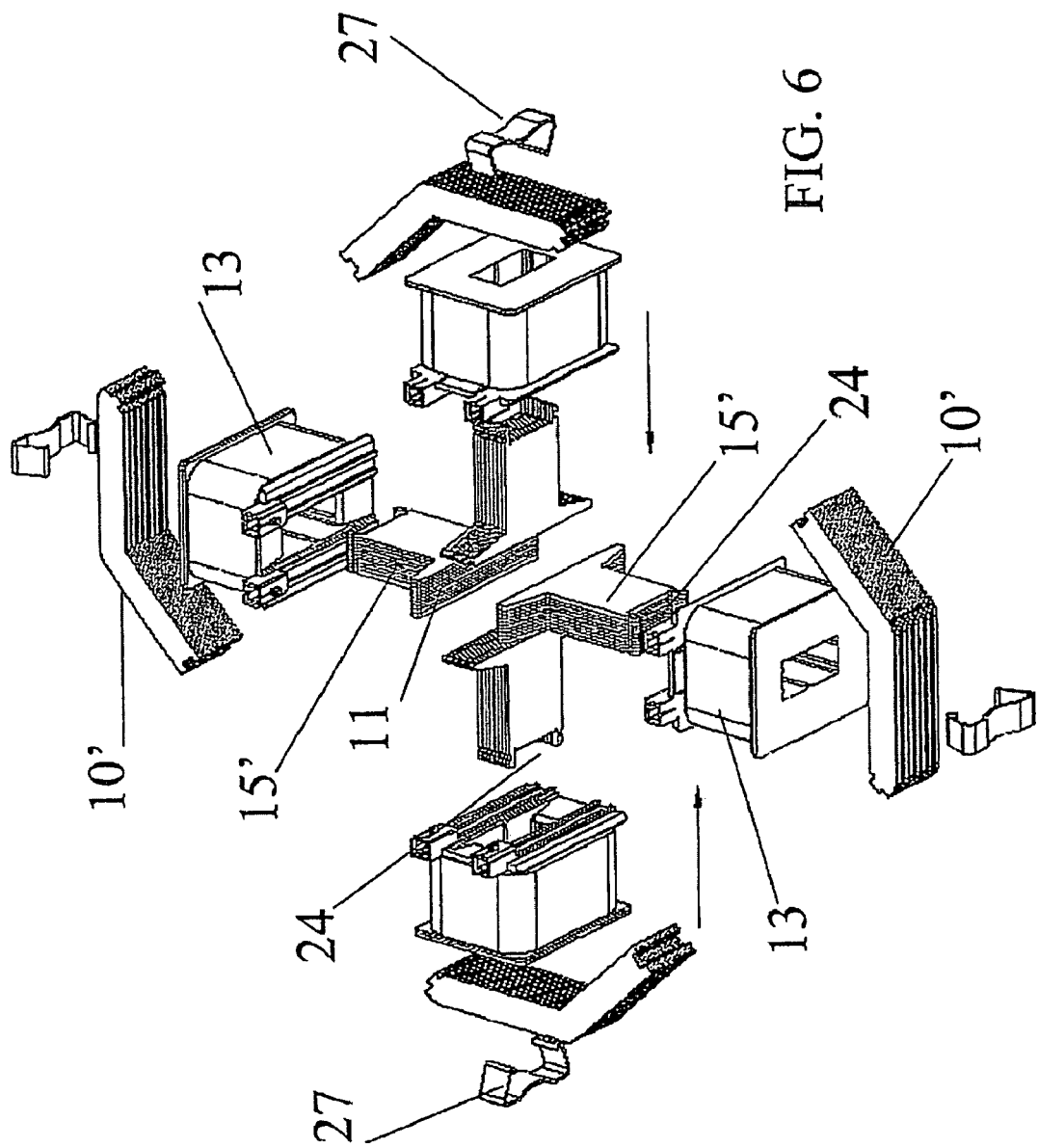
FIG. 6 is a perspective enlarged-scale view of a further embodiment of the detail of FIG. 2.

For example FIG. 6 shows a second embodiment wherein core laminations 15' have the same size and the end 11 turned towards the rotor is, thus, flat and not concave as in the previous embodiment.

A skilled in the art could also assume to use the two solutions in a mixed way by using for example the concave surface solution only for one pair 6 of pole pieces and the flat surface for the other pair 7 of pole pieces.

Figure 4:
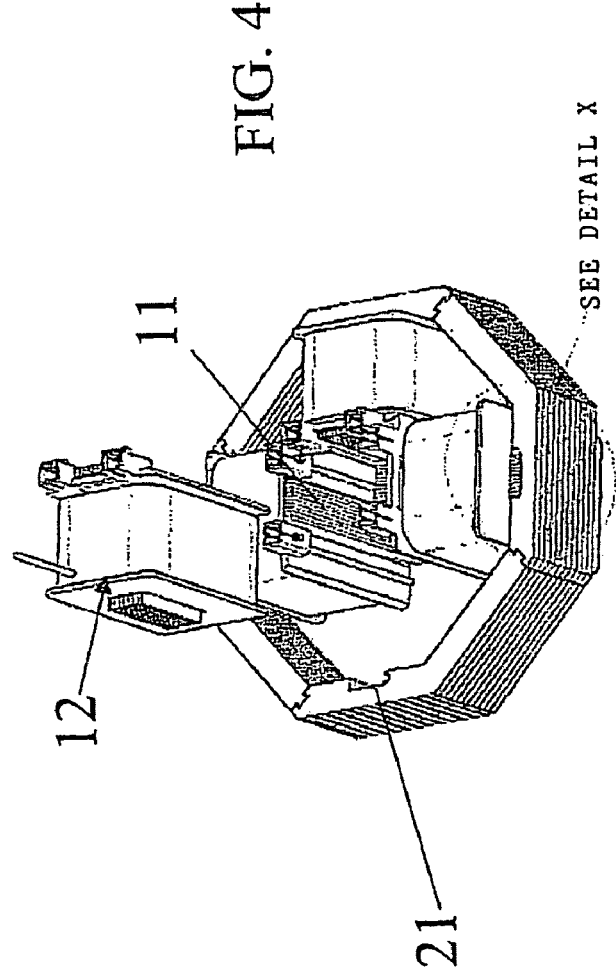
FIG. 4 is a perspective and schematic view of the detail of FIG. 3 in the assembled condition.
Figure 5:
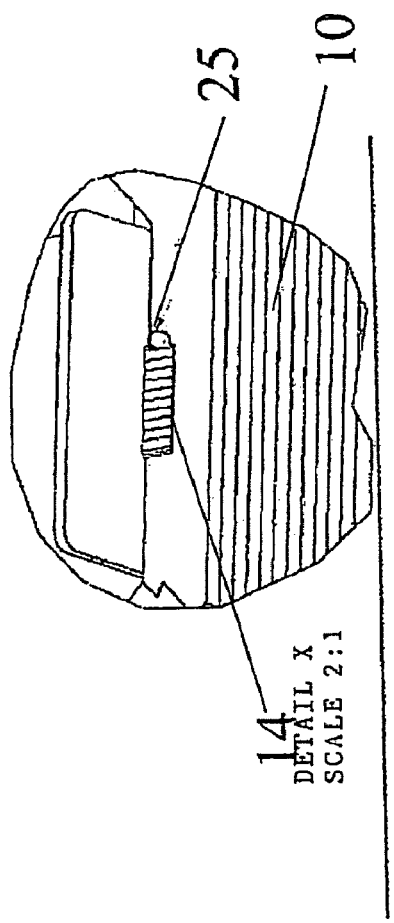
FIG. 5 is a perspective enlarged-scale view of a detail of the particular example of FIG. 3.

It must also be noted that the core 9 of each pole piece 8 is removably associated by pin-coupling or fitting to the core lamination pack 10 of the stator 4, as shown for example in FIGS. 4 and 5.

In this embodiment shown in FIGS. 4 and 5 the stator pack 10 and pole piece configuration is similar to the first embodiment with the end 11 of the pole pieces 8 having a flat shape and the end 14 of the core 9 being inserted in an indent 21 centrally cut in a section of the stator pack 10.

An elastic pin 25 is wedgely inserted between the end 14 of the core 9 and the indent 21 seat.

In this way a quite high connection safety is obtained, with a lower assembly difficulty level.

Instead in the embodiment of FIG. 6 another system has been provided, for coupling the pole piece cores 9' and the corresponding core lamination sections 10' of the stator 4 pack.

The ends 24 of the cores 9' turned towards the stator core lamination pack 10' are substantially square-bracket-shaped so as to partially overlap the stator pack.

More in detail, these ends provide a central flat section 17 and opposed appendices 18, 19 perpendicularly extending with respect to the flat section 17.

Figure 6B:
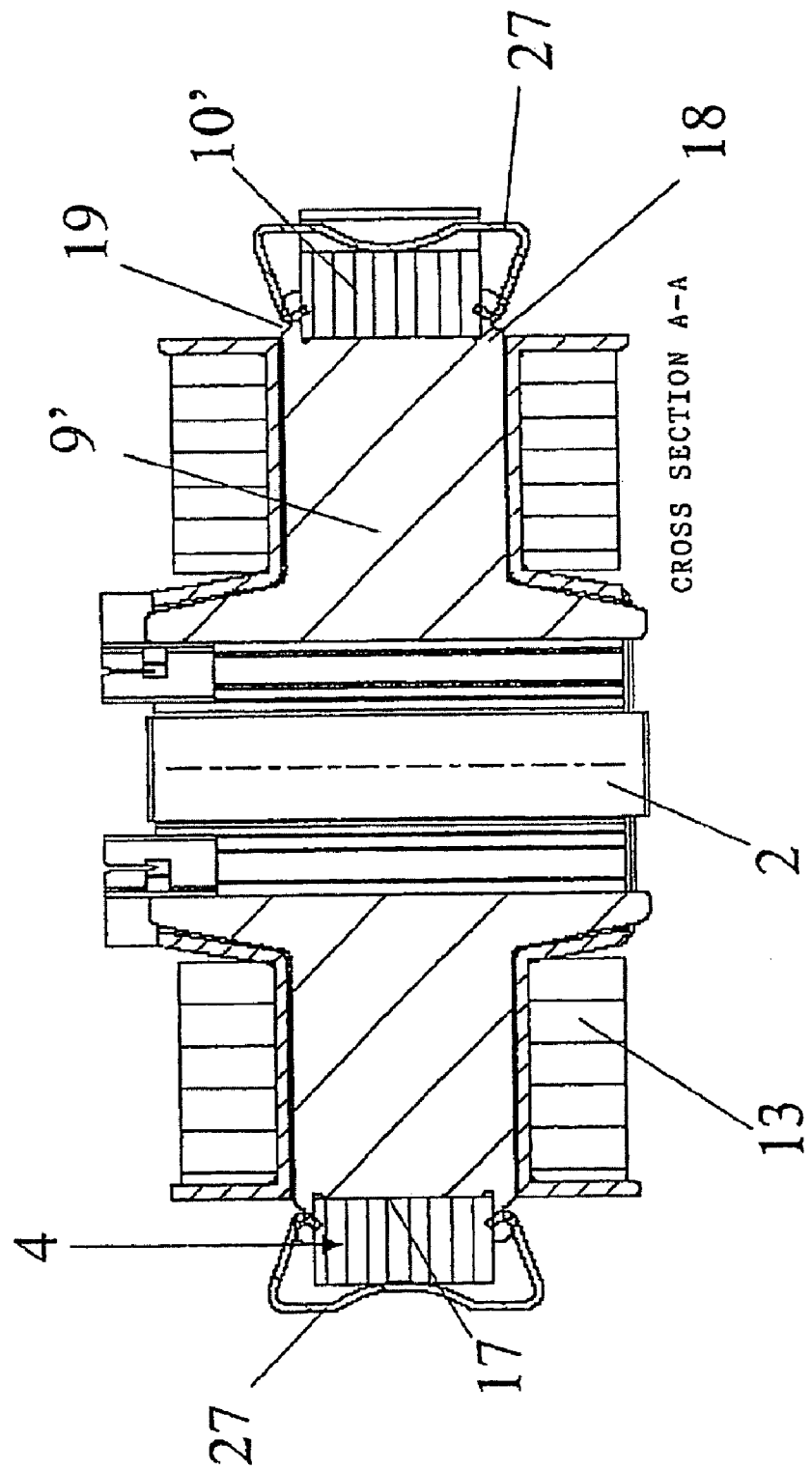
FIG. 6B is a schematic sectional view of the detail of FIG. 6A taken according to the section line A-A.

These appendices 18, 19 overlap and hold like a vice the opposed flat surfaces of the stator core lamination pack 10', as well shown in FIG. 6B. Moreover, this configuration is kept by means of a clip spring 27, being essentially C-shaped, having each end engaged in a respective external notch of each appendix 18 and 19.

The spring 27 externally adheres to the annular edge of the stator core lamination pack 10' and it holds the appendices 18, 19 in position making the whole stator pack coherent, formed by sections 10' and cores 9' extending towards the rotor 2 seat 5.

In a further alternative embodiment of the present invention, the end portion 11 of each pole piece 8 is structurally independent from the respective core 9, whereto it can be connected by quick coupling, for example by mortising, or through a quick coupling which will be described hereafter. In this case the core 9 has a core lamination pack extending in respective planes which are transverse to the rotation axis X.

This alternative embodiment can be common to the first and second embodiment, but it is independent from what has been disclosed with reference to the interconnection modes between the sections 10' of the stator core lamination pack and cores 9 or 9'.

The structure of the motor 1 according to the invention proved to be superior to prior art solutions from the electromagnetic performance point of view. In fact, the permanent-magnet rotor 2 demagnetization is reduced to minimum values. This could be apparently due to the fact that the core lamination of pole pieces 8 free end portions 11, extending in parallel with axis X, distributes much better the flux on the whole axial extension of the rotor 2 permanent magnet. A stator linkage increase has also been experimentally detected with respect to an end being realised with a sintered material, for example SMC.

In this way suitable performances are achieved, still paying attention also to the economical aspect since producing pole piece end portions 11 formed by variable-length core laminations can be expensive or it can however require considerable investments.

To remove possible higher cost problems, it has been provided to realise pole piece 8 end portions 11 being formed by core laminations having the same length; like in the example of FIG. 6, in this case the electromagnetic efficiency is slightly decreased with respect to the previous embodiment, but demagnetization is instead slightly improved due to the higher air gap being created between the rotor 2 permanent magnet and the pole piece 8.

In the embodiment of FIG. 7, another possible connection between a core 9" of the pole piece 8, differently shaped with respect to the previous embodiments, and a corresponding stator 4 pack 10" has been shown in greater detail.

A quick-fitting coupling 28 is shown in FIG. 7, providing a cut 29 in correspondence with the end 34 of the core 9" turned towards the pack 10" and a corresponding slot 20 in a section of the stator 4 pack 10". The cut 29 straddles the pack 10" in correspondence with the slot 20 by realising the quick coupling 18 substantially hook-shaped.

Figure 8:
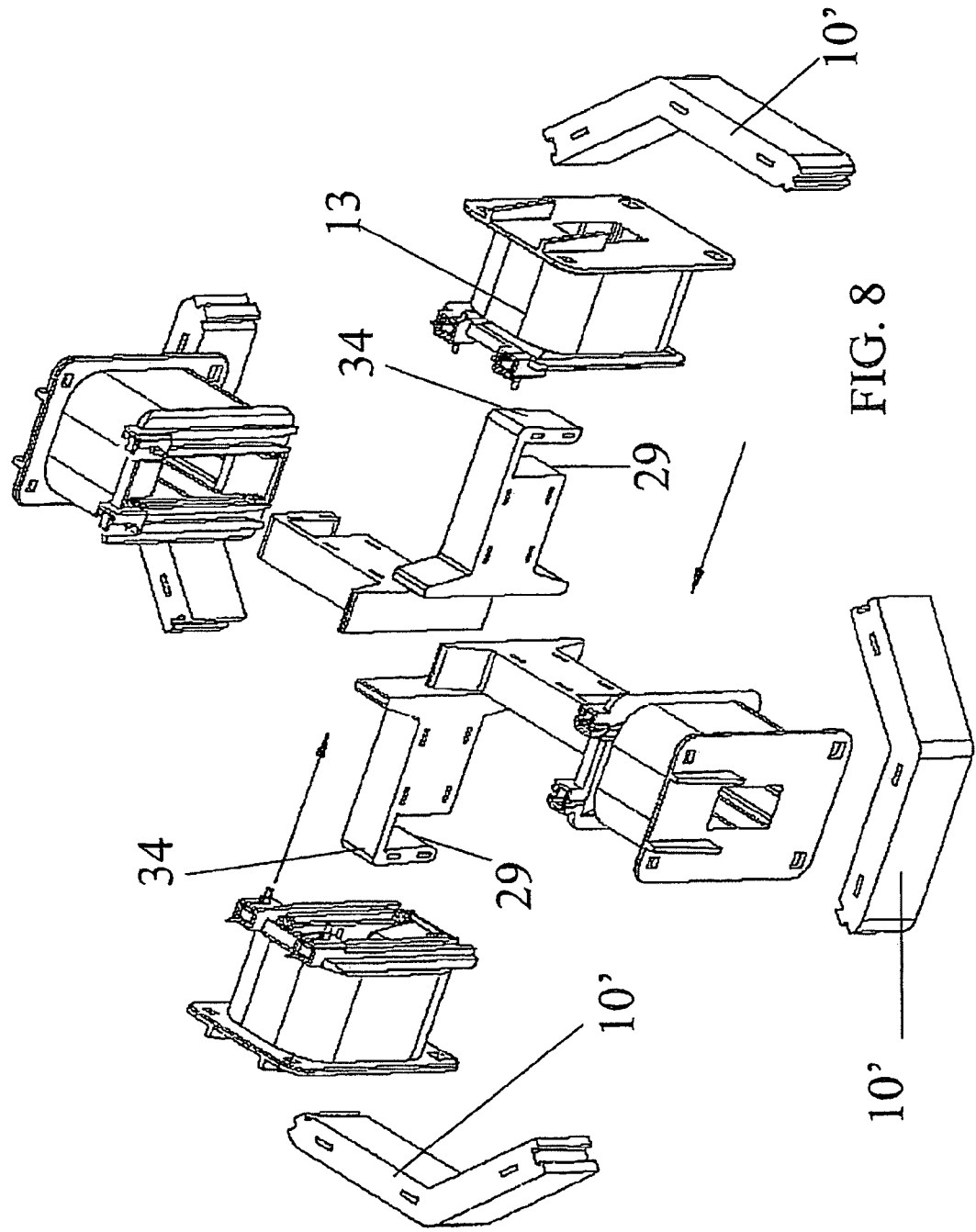
FIG. 8 shows a perspective and schematic exploded view of a detail showing an alternative of the third embodiment of FIG. 7.
Figure 8A:
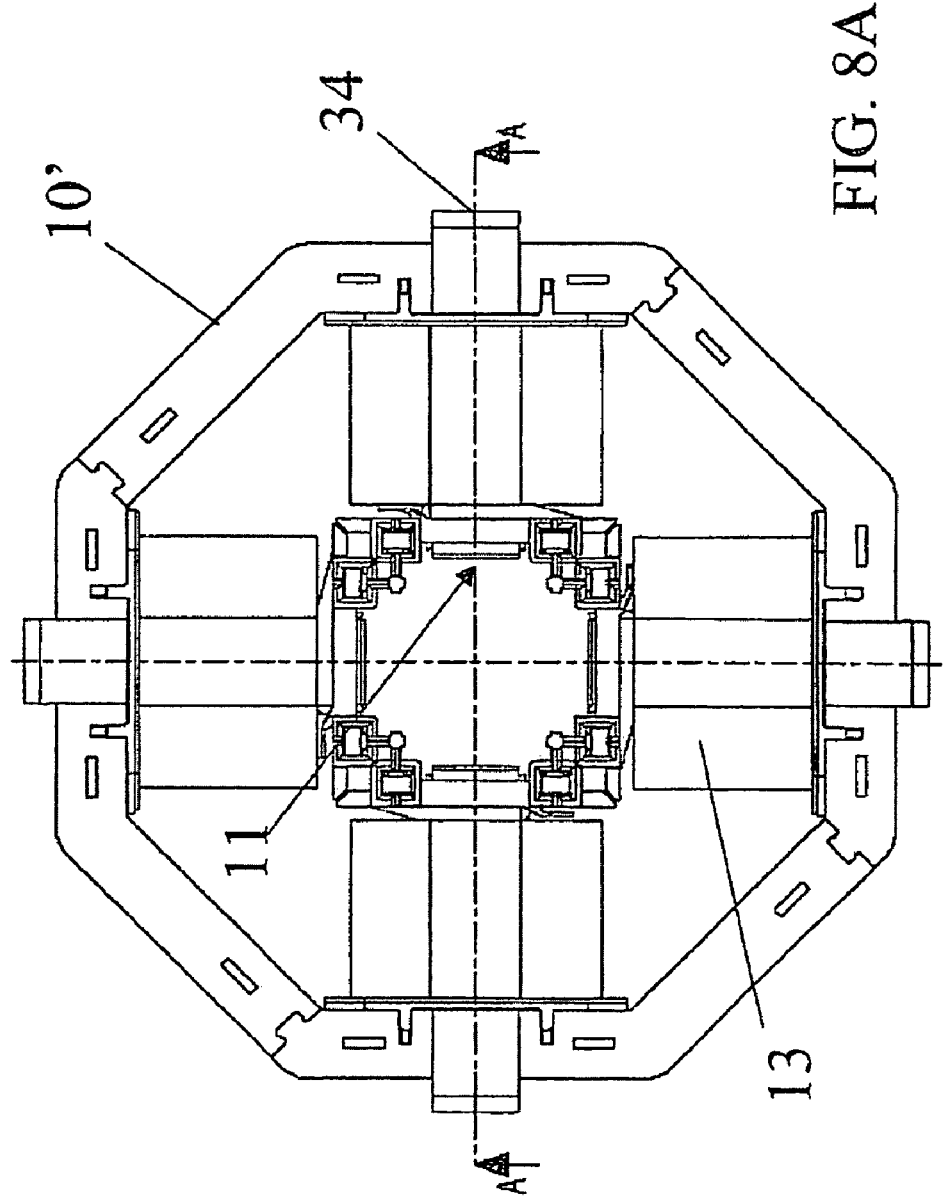
FIG. 8A is a view from above of the detail of FIG. 8 in the assembled condition.

The slot 20 presence is totally optional and FIG. 8 and the following show a solution forgoing the slot 20 and using then the stator core lamination sections 10'.

In this embodiment the height of the stator pack 10' has been preferably decreased, being reduced by few millimeters, and this because of the fact that the pole piece slightly overlaps the pack 10' in the connection area; this solution assures about the connection solidity and it is simple to produce.

The cut 29 allows the end 34 of cores 9" to straddle sections 10' realising a quick-fitting coupling of the type being substantially hook or spike-shaped with interference.

In other terms, the coupling between the ends 34 of cores 9" and the corresponding stator core lamination sections 10' is performed by fitting the cut 29 and the side thickness of sections 10' so that the interference between these elements makes the coupling particularly close.

The shape of such a stator 4 allowed windings to be made of aluminium instead of copper, as generally found in prior art.

This choice, per se independent from the motor 1 shape, proved to be particularly advantageous in terms of lower weight of the winding and of the motor as a whole when referred to the application in a dishwasher washing pump.

Moreover, for the same Joule-effect losses, since aluminium has a higher electric resistivity than copper, it is necessary to increase the conductive wire cross section, thus determining an increase in the aluminium coil volume and subsequently a higher convective thermal exchange external area.

From the above description it clearly results that the motor according to the invention solves the technical problem and it achieves several advantages among which the first one is certainly given by the fact of providing a two-phase synchronous motor with a completely mechanical priming and excellent performances in terms of reduced rotor demagnetization.

Other advantages are due to the very low stator core lamination swarfs and to the simplicity and safety of assembly steps.

Moreover the motor structure according to the invention helps in turning from copper wire windings to aluminium wire windings.

The invention claimed is:

1. A two-phase synchronous electric motor, comprising:
a permanent-magnet rotor, rotating around a respective rotation axis;
a core lamination-pack stator; and
first and second pairs of pole pieces defining a housing/rotation seat for said rotors, wherein each pole piece comprises a core, having an end associated to said core lamination pack, a free end portion facing said rotor housing/rotation seat, and a coil on a respective support wedged on said core,
wherein at least said free end portion of the core of each pole piece comprises a core lamination pack extending in respective planes being parallel or passing through said rotation axis of the permanent-magnet rotor, said core laminations having a variable length to form a surface of said free end portion of the core of each pole piece being concave in the axial direction and partially wrapping said rotor,
wherein the core of each pole piece is removably associated by pin-fitting to the core lamination pack of the stator, an end of the core being inserted in an indent cut in the core lamination pack of the stator and held therein by an elastic pin, said elastic pin being wedgedly inserted between the end of the core and an indent cut in the core lamination pack stator, and
wherein the motor comprises a coupling between the rotor and a load by means of at least one motion transmission joint comprising a driving element and a driven element being associated in a kinematic series.

2. An electric motor according to claim 1, wherein said core and corresponding free end portion are realised enbloc and they are composed by a single core lamination pack extending in respective parallel planes to said rotation axis.

3. An electric motor according to claim 1, wherein said end portion of each pole piece is structurally independent from the respective core, whereto it can be connected by quick coupling.

4. An electric motor according to claim 1, wherein the axial extension of said pole pieces reaches 95% of the rotor axial extension.

5. An electric motor according to claim 1, wherein the coil is wrapped on said aluminum wire support.

6. An electric motor according to claim 1, wherein said first and second pairs of pole pieces have ends wrapping said rotor and they are associated to corresponding windings and in that the power supply to the windings of one of the pole piece pairs is obtained by interposing a capacitor.

7. A two-phase synchronous electric motor, comprising:
a permanent-magnet rotor, rotating around a respective rotation axis;
a core lamination-pack stator; and
first and second pairs of pole pieces defining a housing/rotation seat for said rotor,
wherein each pole piece comprises a core, having an end associated to said core lamination pack and a free end portion, facing said rotor housing/rotation seat, a coil on a respective support wedged on said core,
wherein at least said free end portion of the core of each pole piece comprises a core lamination pack extending in respective planes being parallel or passing through said rotation axis of the permanent-magnet rotor;
wherein said core lamination packs have a variable length to form a surface of said free end portion of the core of each pole piece, being concave in the axial direction and partially wrapping said rotor,
wherein an end of the cores turned towards the stator core lamination pack is substantially square-bracket-shaped so as to partially overlap the stator pack,
wherein said end provides a central flat section and opposed appendices perpendicularly extending with respect to the flat section in order to overlap and hold like a vice the opposed flat surfaces of the stator core lamination pack,
wherein the motor provides a clip spring, which is essentially C-shaped, having each end engaged in a respective external notch of each of said appendices,
wherein said spring externally adheres to the annular edge of the stator core lamination pack and it holds said appendices in position making the whole stator pack coherent, and
wherein the motor comprises a coupling between the rotor and a load by means of at least one motion transmission joint comprising a driving element and a driven element being associated in a kinematic series.

8. A two-phase synchronous electric motor, comprising a permanent-magnet rotor, rotating around a respective rotation axis, and a core lamination-pack stator,
- wherein a first and second pairs of pole pieces define a housing rotation seat for said rotor,
- wherein each pole piece comprises a core, having an end associated to said core lamination pack and a free end portion, facing said rotor housing/rotation seat, a coil on a respective support wedged on said core,
- wherein at least said free end portion of the core of each pole piece comprises a core lamination pack extending in respective planes being parallel or passing through said rotation axis of the permanent-magnet rotor;
- wherein said core laminations have a variable length to form a surface of said free end portion of the core of each pole piece being concave in the axial direction and partially wrapping said rotor,
- wherein an end of the core being equipped with a cut straddles the stator core lamination pack to form a quick-fitting coupling with interference between coupling elements, and
- wherein the motor comprises a coupling between the rotor and a load by means of at least one motion transmission joint comprising a driving element and a driven element being associated in a kinematic series.

* * * * *